(12) United States Patent
Meshenky et al.

(10) Patent No.: US 6,948,909 B2
(45) Date of Patent: Sep. 27, 2005

(54) FORMED DISK PLATE HEAT EXCHANGER

(75) Inventors: Steven P. Meshenky, Racine, WI (US); Robert J. Barfknecht, Waterford, WI (US); Kenneth M. Cornell, Oak Creek, WI (US); James J. Hennes, Milwaukee, WI (US); LeRoy Goines, Racine, WI (US); Peter C. Kottal, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 81 days.

(21) Appl. No.: 10/663,312

(22) Filed: Sep. 16, 2003

(65) Prior Publication Data

US 2005/0058535 A1 Mar. 17, 2005

(51) Int. Cl.⁷ .............................. F01D 25/12
(52) U.S. Cl. ................ 415/179; 415/180; 165/125
(58) Field of Search ................ 165/125; 415/149.1, 415/179, 191, 175, 176, 177, 178, 180

(56) References Cited

U.S. PATENT DOCUMENTS

| | | | |
|---|---|---|---|
| 3,424,240 A | 1/1969 | Stein et al. | |
| 3,800,866 A | 4/1974 | Ireland et al. | |
| 4,073,338 A * | 2/1978 | Fujikake et al. | 415/177 |
| 4,696,342 A | 9/1987 | Yamauchi et al. | |
| 4,932,467 A | 6/1990 | Wigmore et al. | |
| 5,179,999 A | 1/1993 | Meekins et al. | |
| 5,409,056 A | 4/1995 | Farry, Jr. et al. | |
| 5,678,419 A | 10/1997 | Sanada et al. | |
| 5,680,897 A | 10/1997 | Kilmer | |
| 5,896,916 A | 4/1999 | Baechner et al. | |
| 6,318,455 B1 | 11/2001 | Nakado et al. | |
| 6,446,712 B1 | 9/2002 | Wu et al. | |
| 6,526,751 B1 | 3/2003 | Moeckel | |
| 6,764,279 B2 * | 7/2004 | Meshenky | 415/179 |
| 2002/0144810 A1 | 10/2002 | Klingler et al. | |

FOREIGN PATENT DOCUMENTS

CH 530607 12/1972

* cited by examiner

Primary Examiner—Edward K. Look
Assistant Examiner—Richard A. Edgar
(74) Attorney, Agent, or Firm—Wood, Phillips, Katz, Clark & Mortimer

(57) ABSTRACT

A compact rotary compressor unit within internal intercooling includes a rotary shaft (10) with at least one compressor wheel (14,16) mounted thereon for rotation therewith. The compressor wheel (14,16) has an inlet end (18) of relatively small diameter and a radial discharge end (20) of relatively large diameter. A nominally donut-shaped intercooling heat exchanger (42) is centered about the shaft (10) to receive compressed air from the compressor wheel and cool the same. Both the compressor wheel (14,16) and the heat exchanger (42) are confined in a housing (28).

27 Claims, 18 Drawing Sheets

FORMED DISK PLATE HEAT EXCHANGER

FIELD OF THE INVENTION

This invention relates to heat exchangers, and more particularly, to a heat exchanger that is made of formed disks to define heat exchange fluid flow paths for a first fluid and which are stacked as units and sandwich fins through which a second heat exchange fluid passes.

BACKGROUND OF THE INVENTION

As is well known, when a gas is compressed, its temperature increases. As a consequence, the compressed gas is not as dense as it would be at the same pressure but at a lower temperature.

In many instances, this is not of particular concern. However, there are probably an equal number of instances where the lesser density of the gas may have an undesirable effect on the performance of the system in which the gas is being used.

A common example of the latter is in internal combustion engine systems employing superchargers or turbochargers to compress the oxidant for the fuel, typically air. When a compressed oxidant, such as air, is delivered to the combustion chamber of an engine, engine output can be increased because the compressed air contains a greater quantity of oxygen and thus will support a greater fuel charge which in turn will provide more power.

However, the amount of power can be increased further if the compressed air is cooled after being compressed and before being subjected to combustion. The cooled compressed air will contain more oxygen than a hotter air charge at the same pressure. Consequently, an even greater fuel charge can be provided with the result that even greater power output may be obtained.

As a consequence, many such systems have so-called "intercoolers", also known as "charge air coolers". These devices are heat exchangers through which the combustion air passes after it has been compressed as by a turbocharger or a supercharger and before the combustion air is passed to the engine. In the heat exchanger, the compressed air is caused to reject heat to an appropriate coolant which itself may be air such as ambient air or a liquid coolant such as engine coolant.

In typical installations, as for example, in vehicles, the intercooler heat exchanger is stacked with other heat exchangers employed in the vehicle as, for example, radiators, condensers, oil coolers, etc. and thus adds to the volume requirements of the engine compartment in which such components are typically housed. Furthermore, because intercooler heat exchangers are cooling a gas rather than a liquid, rather sizable ducting may be required to deliver the compressed air from the location in the engine compartment whereat the intercooler heat exchanger is located from the turbocharger or supercharger and to the engine.

These volume requirements may hinder the designer of such a system from achieving a more aerodynamic shape for the vehicle which in turn will lead to decreased fuel efficiency.

The present invention is directed to overcoming one or more of the above problems.

SUMMARY OF THE INVENTION

It is the principal object of the invention to provide a new and improved heat exchanger for cooling the compressed gas output of a compressor. It is also an object of the invention to provide such a heat exchanger that is ideally suited for use as an intercooler heat exchanger in connection with a turbocharger or a supercharger for an internal combustion engine. It is a further object of the invention to provide such an intercooler heat exchanger for use in the propulsion system of a vehicle.

An exemplary embodiment of the invention achieves the foregoing objects in a system including a rotary compressor that includes a shaft rotatable about an axis. At least one compressor wheel is mounted on the shaft for rotation therewith and has an inlet end of relatively small diameter and a radial discharge end of relatively large diameter. A nominally donut-shaped intercooling heat exchanger is centered about the shaft and adjacent the turbine wheel. The heat exchanger has heat exchange fluid flow paths in heat exchange relation with each other including a compressed gas flow path and a coolant flow path. The coolant flow path is, in part, bounded by a wall of a diameter at least as great as the relatively large diameter. A housing is provided for the compressor wheel and the heat exchanger and together with the wall define a compressed air directing space extending from the radial discharge end of the compressor wheel to an entrance to the compressed air path of the heat exchanger.

In a preferred embodiment, the heat exchanger includes plural pairs of plates with the plates of each pair being centrally apertured and having a generally circular outer, axially directed peripheral wall and a generally circular, inner, axially directed peripheral wall with a generally flat area extending between the peripheral walls. Radially directed flanges are on each peripheral wall axially spaced from the flat area of the corresponding plate and the flanges on the plates of each pair are abutted and sealed together to define a flattened, nominally donut-shaped units defining annular flow parts of the coolant flow path. The pairs of plates are alternatingly stacked with fin structures extending between the radially inner and outer peripheral walls to define radial flow parts of the compressed gas flow paths.

In one embodiment, there is one of the units on each axial end of the heat exchanger with the flat area of one of the plates of one end unit defining the wall.

A highly preferred embodiment contemplates that each fin structure be a circular serpentine fin having circumferentially alternating crests and valleys with the crests thereof in heat exchange thermal contact with the units between which each fin is located.

A highly preferred embodiment contemplates that each of the units includes a radially outwardly directed tab with the tab of each unit being aligned with the tab of each other unit throughout the stack. The tab of each unit further extends radially outwardly past the serpentine fins and axially into sealed engagement with each other. Two apertures are located at each tab and establish fluid communication between the units in the stack and a flow blocking partition extends across the flat areas of each plate of each unit between the radially inner peripheral walls and the radially outer walls of the tabs and at a location between the two apertures of each unit.

In a highly preferred embodiment, a plurality of flow straightening vanes are thermally coupled to the wall and extend across the compressed air directing space so that heat in the compressed air may be rejected to the vane and then to coolant in the coolant flow paths.

A variety of different embodiments are disclosed, each being unique to a particular configuration or coolant flow path.

In one such embodiment, the coolant inlets and outlets are located in a tab-like structure that protrudes from one side of the units and allows thermally bridged flow straightening vanes to be attached to both sides of the heat exchanger.

In another embodiment, the configuration provides one coolant flow pass with split flow with the inlet and outlets being on opposite sides of the heat exchanger and located in tab-like structures extending outwardly therefrom. Again, this embodiment permits the attachment of thermally bridged flow straightening vanes to both sides of the heat exchanger.

In still another embodiment, the inlets and outlets are located in a tab-like structure extending from a side of the heat exchanger with provision made for two passes of coolant flow. Again, thermally bridged flow straightening vanes can be attached to both sides of the cooler.

Still another embodiment contemplates a reduced height tab-like structure to which coolant inlet and outlet fixtures are connected to provide less obstruction to air flow through the core and again, thermally bridged flow straightening vanes may be mounted on both sides of the heat exchanger.

A further embodiment contemplates that the inlet and outlet extend from within the radially outer periphery of the donut-shaped heat exchanger to eliminate any obstruction to air flow by the inlet and outlet structures. In this embodiment, thermally bridged flow straightening vanes can be attached to either side of the heat exchanger.

A further embodiment also allows for totally unobstructed air flow through the heat exchanger by placing the inlet and outlet radially inward of the radially outer periphery of the heat exchanger and provides for a coolant flow path that includes two passes. Like the embodiment mentioned immediately preceding, this embodiment allows flow straightening vanes to be attached to either side of the core.

Other objects and advantages will become apparent from the following specification taken in connection with the accompanying drawings.

DESCRIPTION OF THE PREFERRED EMBODIMENTS

In the following description, the invention will be described in the context of a turbocharger for an internal combustion engine employed in the propulsion system of a vehicle. However, it is to be understood that the invention is not so limited. For example, it may be utilized in any compressor system wherein it is desirable to cool compressed air emanating from the compressor. It may be utilized with efficacy between stages of a multi-stage compressor, may be employed in a supercharger as well as a turbocharger, whether or not employed with a vehicle engine. Hence, no restriction to use in particular environments or with particular types of compressor systems is intended except insofar as expressly stated in the appended claims.

Figure 1:
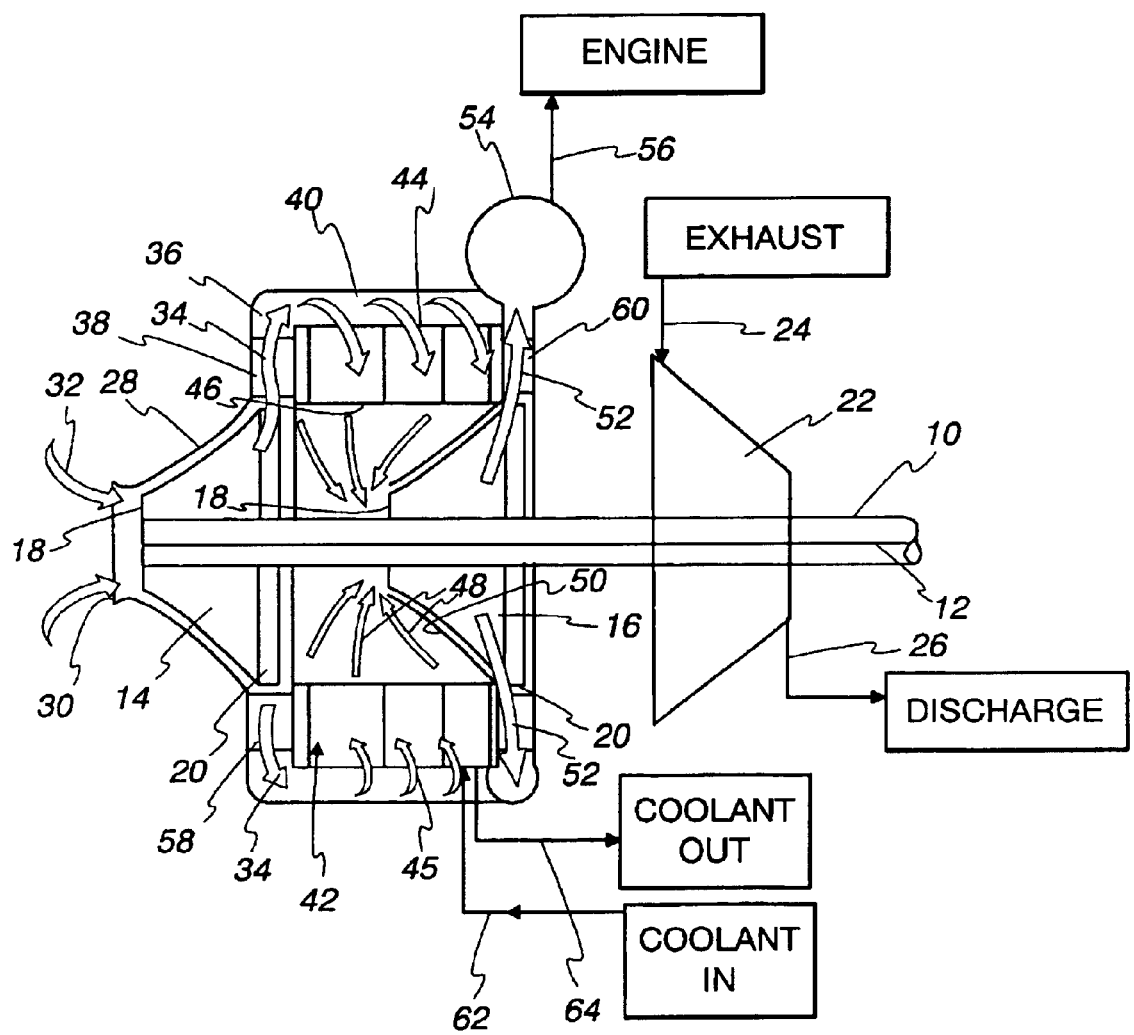
FIG. 1 is a somewhat schematic, sectional view of a rotary compressor embodying the invention, specifically, a turbocharger.

Referring to FIG. 1, an exemplary embodiment of the invention is illustrated and is seen to include a compressor having a rotary shaft 10 mounted by suitable means (not shown) for rotation about an axis 12. In the illustrated embodiment, two conventional compressor wheels 14 and 16 are mounted on the shaft 10 for rotation therewith and respectively form the first and second stages of a two-stage compressor.

Each of the compressor wheels 14,16, has a narrow inlet end 18 of relatively small diameter and a relatively large diameter discharge end 20 that discharges compressed air radially outwardly.

In the illustrated embodiment, a turbine wheel 22 is also mounted on the shaft 10 and may receive the exhaust from, for example, an internal combustion engine, as indicated by an arrow 24. The hot exhaust expands within the turbine wheel 22 and is discharged to atmosphere as indicated by an arrow 26. The expansion of the exhaust against the turbine wheel 22 causes the turbine wheel 22 to rotate the shaft 10 and thus provide a source of motive power for the compressor wheels 14,16.

The compressor wheels 14,16 are housed in a housing shown schematically at 28 which has an inlet 30 adjacent the narrow end 18 of the first stage turbine wheel 14. Air to be utilized for combustion in the engine of the system enters the inlet 30 as indicated by arrows 32 and is confined against the turbine wheel 14 by the housing 28 as it is compressed and ultimately discharged in a radial direction as indicated by arrows 34 that extend through an annular compressed air directing space 36. As illustrated in FIG. 1, the compressed air directing space 36 has a radial section 38 aligned with the discharge end 20 of the compressor wheel 14 which, at its radially outer extremity, connects to an axially directed part 40 of the compressed air directing space 36.

Within the housing 28 is an intercooling heat exchanger, generally designated 42, to be described in greater detail hereinafter. With reference to FIG. 1, it sufficient to note that the heat exchanger 42 has a cylindrical radially outer surface 44 which serves as an inlet for the compressed air to be cooled as shown by arrows 45. The inlet surface 44 is, of course, in fluid communication with the compressed air directing space 36, and in particular, with the axially extending part 40 thereof.

The heat exchanger 42 also has a generally cylindrical radially inner side 46 which serves as an outlet for the compressed air so that the compressed air cooled by the heat exchanger 42 may flow in the direction of arrows 48 to the inlet or narrow end 18 of the second stage turbine wheel 16 to be further compressed thereby. The housing 28 includes a conventional compressor wheel shroud 50 to confine the once compressed, cooled gas against the second stage turbine wheel 16.

After being compressed the second time by the second stage compressor wheel 16, the compressed air is discharged radially outwardly as indicated by arrows 52 to enter a conventional volute 54 which then is connected to the combustion air intake for the engine as indicated by an arrow 56.

To maximize the efficiency of the compression process, rotary compressors of the sort just described typically include flow straightening or diffuser vanes 58 adjacent the discharge ends 20 of turbine wheels such as the turbine wheels 14,16. The vanes 58 are located in the radially extending part 38 of the compressed air directing space 36 while similar vanes 60 are located radially outwardly of the discharge end 20 of the second stage compressor wheel 16 at a location between the discharge end 20 and the volute 54. In accordance with one embodiment of the invention, the vanes 58 and 60 are thermally coupled to the heat exchanger 42 so that heat in the compressed air emanating from the associated compressor wheel 14,16 is rejected to the vanes 58,60 and then to coolant circulated within the heat exchanger 42 as will be seen.

The system is completed by a coolant inlet 62 to the heat exchanger 42 and a coolant outlet 64 from the heat exchanger 42, both to be described in greater detail hereinafter.

Figure 2:
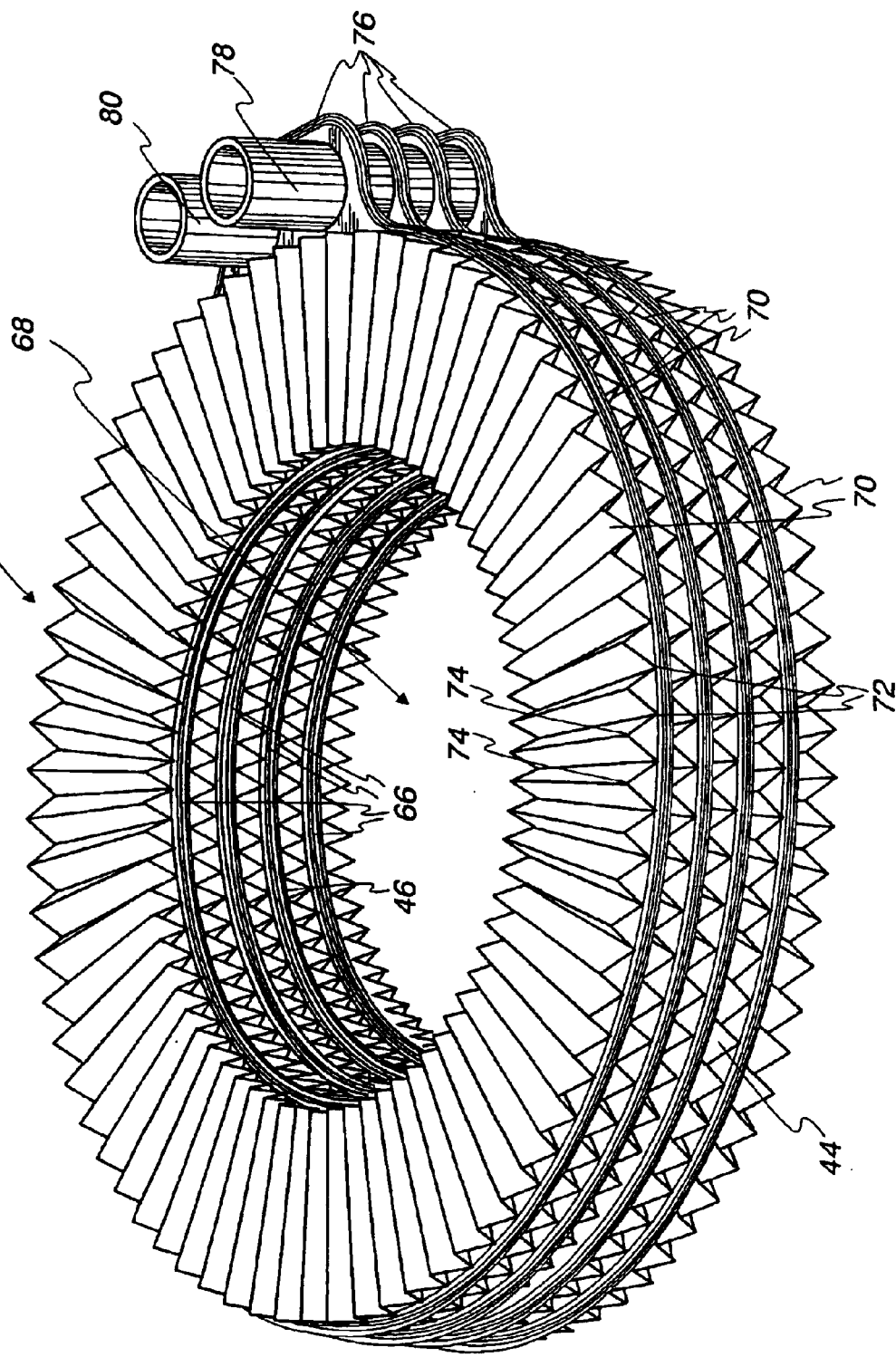
FIG. 2 is a perspective view of one embodiment of a heat exchanger made according to the invention.

Turning now to FIG. 2, one embodiment of the heat exchanger 42 is illustrated. The same is made up of a stack of heat exchange units 66, four of which are shown in FIG. 2. A greater or lesser number could be used as desired, depending upon the desired capacity of the heat exchanger 42. The units 66 are each fabricated of two, circular plates having a central aperture, generally designated 68, so as to form a nominally donut-shaped unit. Between adjacent ones of the units 66, a circular fin structure 70 is located. That is to say, a stack of the units 66 and fin structures 70 is provided with the units 66 alternating with the fin structures 70.

In a preferred embodiment, the fin structures 70 are composed of serpentine fins having alternating crests 72 and valleys 74. The crests 72 are placed in heat exchange contact with a side of the units 66 between which each fin structure 70 is sandwiched. Typically, this will involve metallurgical bonding such as soldering, brazing, or possibly even welding.

It is to be noted that the crests and valleys 72, 74 are elongated radially. Thus, they provide flow paths from the inlet side or outer surface 44 of the heat exchanger 42 to the outlet side 46 which is defined by the central apertures 68 in the stack.

At any desired location about the periphery of the heat exchanger 42, each of the units 66 includes a radially outwardly directed tab 76. The tabs 76 of each unit 66 are aligned and, as will be seen, provide for fluid communication between the various ones of the units 66. The tabs include a fitting 78 which may be utilized as an inlet for the coolant (62 in FIG. 1) and a second fitting 80 which may be utilized as an outlet for the coolant (64 in FIG. 1).

In the embodiment shown in FIG. 2, the ends of the stack defining the heat exchanger 42 are defined by fin structures 70 which may extend into the radially extending part 38 of the compressed air directing space 36 in the case of one of the fin structures 70 or into the space between the discharge end 20 of the second stage compressor wheel and the volute 54 in the case of the other fin structure 70. In these locations, compressed air leaving the discharge ends of the compressor wheels 14,16, pass through the endmost fin structures 70 to reject heat thereto which ultimately is rejected to coolant flowing through the units 66.

Figure 3:
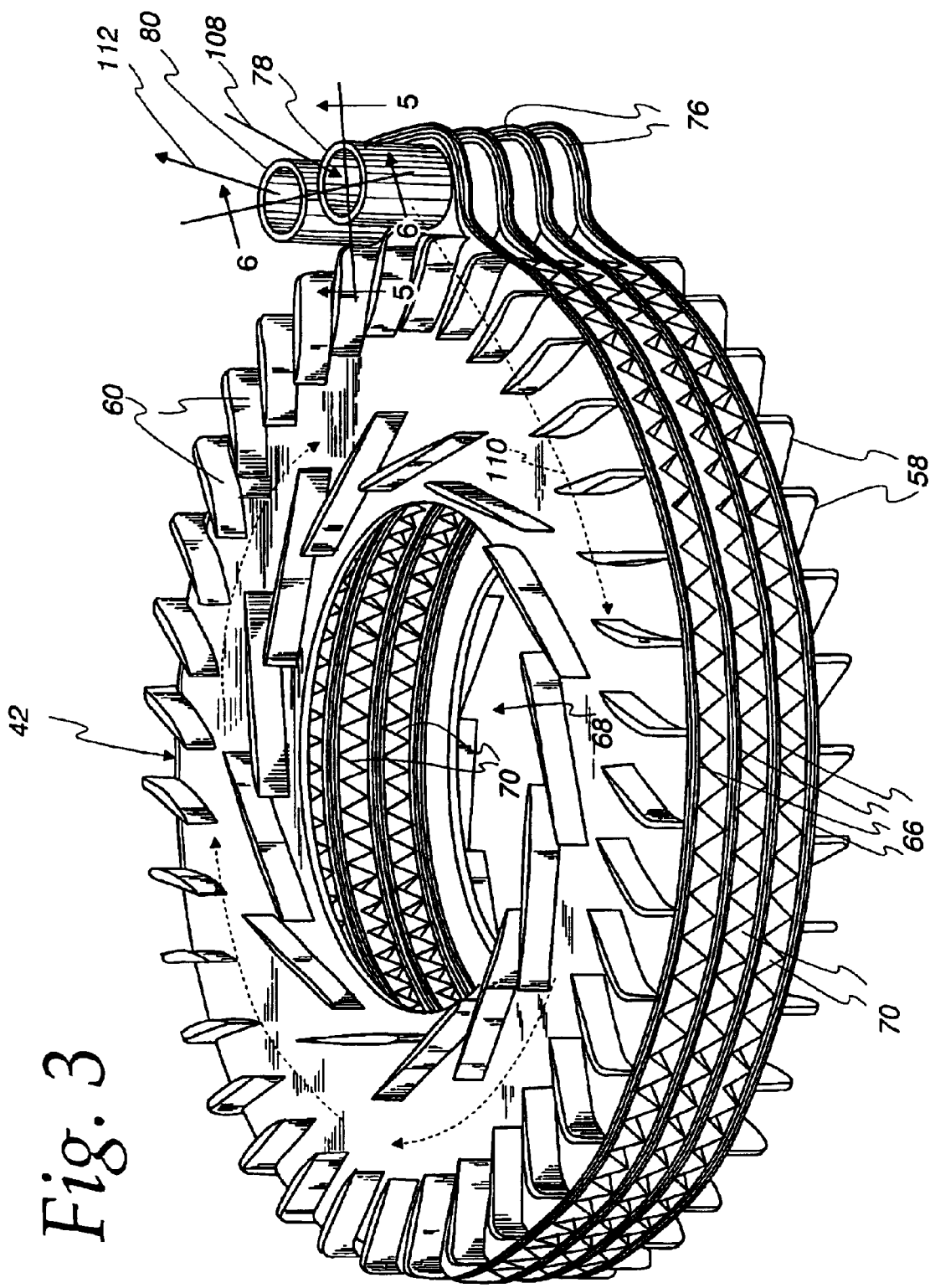
FIG. 3 is a view similar to FIG. 2 but of a modified embodiment of the invention.

FIG. 3 illustrates an alternative embodiment that is made up generally the same as the one illustrated in FIG. 2 except that the endmost fin structures 70 are replaced by the diffuser or flow straightening vanes 58 and 60 on respective ends of the heat exchanger 42. The vanes 58 and 60 may have conventional configurations and, as mentioned previously, are thermally linked to the units 66, typically by a metallurgical bond again, as by soldering, brazing or welding.

Figure 4:
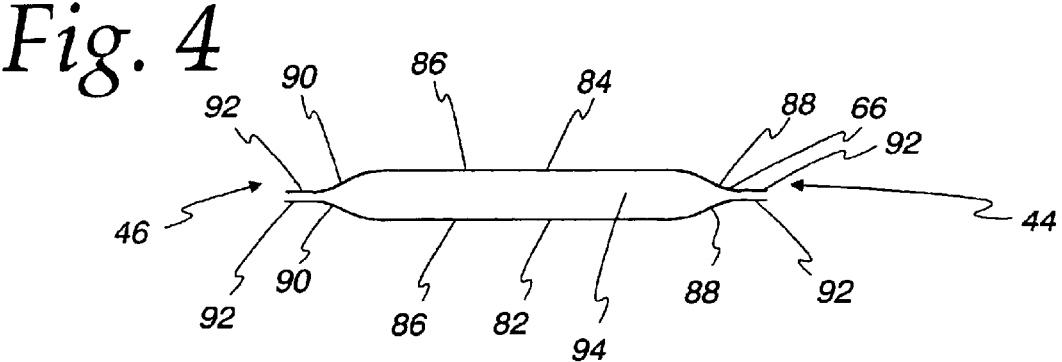
FIG. 4 is a somewhat schematic sectional view of part of a single heat exchange unit.
Figure 5:
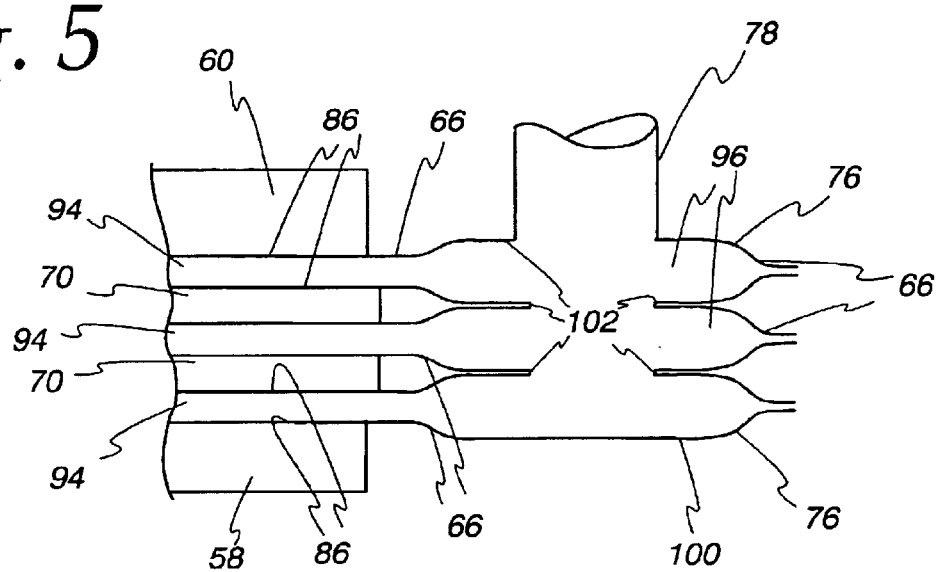
FIG. 5 is a somewhat schematic, sectional view taken approximately along the line 5—5 in FIG. 3.
Figure 6:
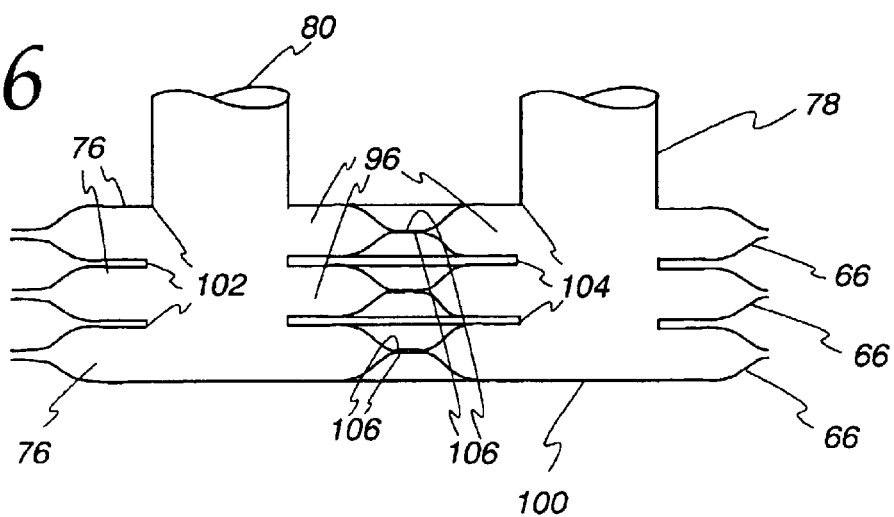
FIG. 6 is a somewhat schematic, sectional view taken approximately along the line 6—6 in FIG. 3.

The construction of the units 66 can be better understood from FIGS. 4, 5 and 6 and attention is directed thereto.

As noted previously, each of the units 66 is made up of two metallic plates, 82 and 84 respectively. Each of the plates has a flat central section 86 which extends to an axially directed wall 88 at its radially outer side, that is, the inlet side 44, and an axially directed wall 90 at its radially inner side, that is the outlet side 46. Each of the walls 88,90 terminate in a radial, flat flange 92 and the plates 82 and 84 of each pair are abutted to one another such that their flanges 92 are secured and sealed to one another. Typically, this will be accomplished by soldering, brazing or even welding. The result is a generally circular flow space 94 through which coolant may flow around a circular coolant flow path from the inlet fixture 78 to the outlet fixture 80.

At the tab 76, each of the two plates 82,84, is expanded axially away from the corresponding flat part 86 of the plate so as to abut the tab of the adjacent one of the units 66. This abutment is shown in FIGS. 5 and 6 and the parts of the plates 82 and 84 defining the resulting expanded spaces, shown at 96, are secured to each other and sealed, again, as by metallurgical bonding of the type mentioned previously.

The endmost one of the plates 82,84, designated 100 in FIGS. 5 and 6 is imperforate in the area of the tabs 76 while all of the other plates 82,84, include a pair of apertures 102,104 (only the apertures 102 are shown in FIG. 5). The apertures 102,104 are aligned with one another and with respective one of the fixtures 78,80, thereby providing for fluid communication between the units 66.

To assure that the coolant flows about the entire periphery of each of the units 66 and does not short circuit itself by flowing directly from the inlet fixture 78 to the outlet fixture 80, elongated depressions 106 are stamped in each of the plates 82,84 making up each of the units 66 at a location between the fixtures 78,80 and extend from the radially outer edge of the tabs 76 all the way to the radially inner or inlet side 46 of the units. The depressions 106 are abutted against one another and metallurgically bonded to each other to provide a seal at this location. As a consequence, incoming coolant indicated by an arrow 108 (FIG. 3) flows through the inlet in the direction of a dotted arrow 110 to emerge through the fitting 80 as shown by an arrow 112.

As the air to be cooled is flowing radially through the fin structures 70, a cross flow heat exchange regime exists. The same is true for compressed air flowing through the vanes 58,60.

Figure 7:
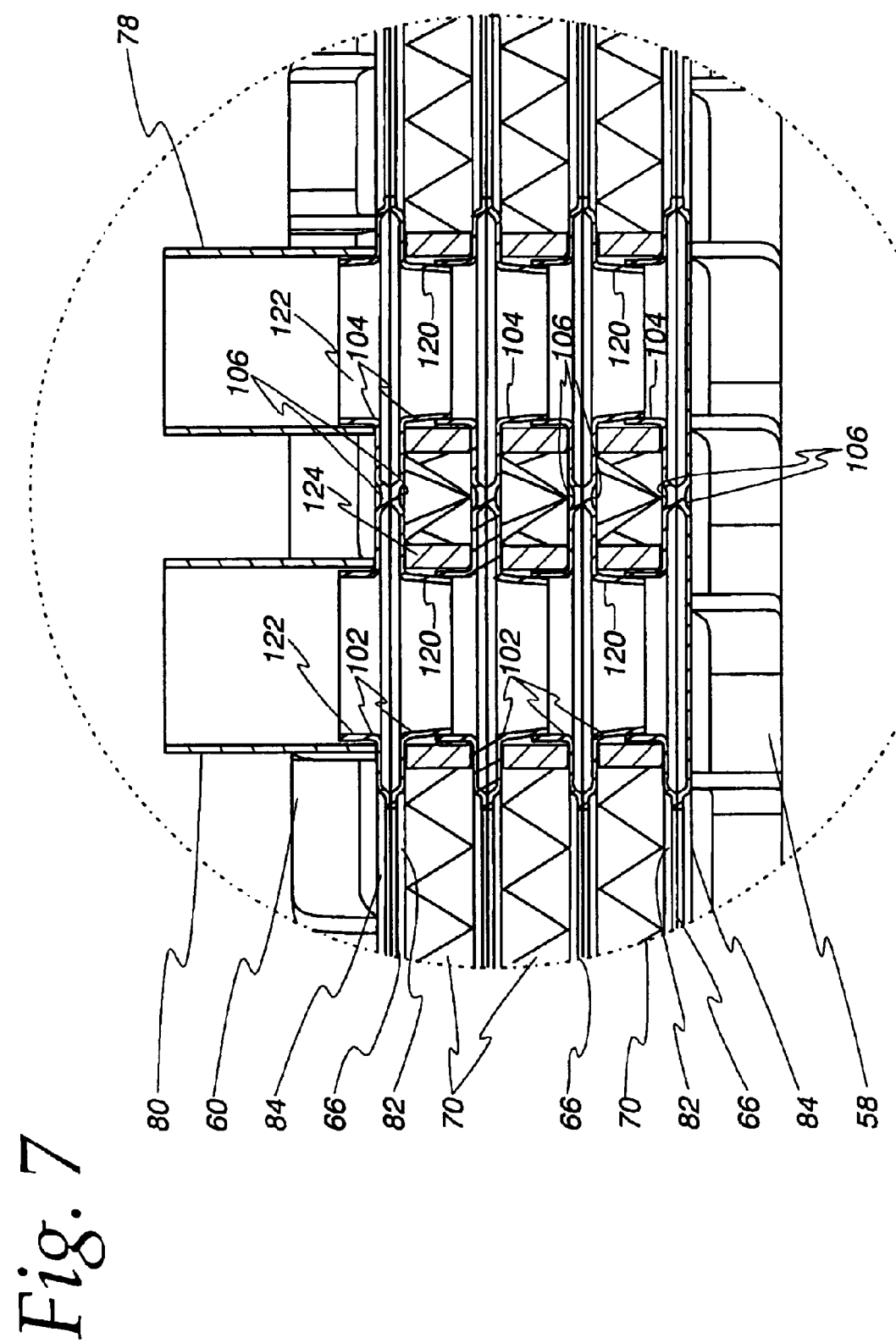
FIG. 7 is an enlarged view similar to FIG. 6 but illustrating an alternative inlet and outlet structure.

FIG. 7 illustrates an inlet and outlet port structure that is an alternative for that illustrated in FIG. 6. Where like parts are employed, like reference numerals are utilized in the interest of brevity.

In the embodiment illustrated in FIG. 7, the plate 82 has an axially downwardly directed, frustoconically shaped collar 120 surrounding each of the apertures 102 and 104. In contrast, each of the plates 84 has an integral, upwardly directed, generally cylindrical collar 122 surrounded each of the apertures 102 and 104. The inside diameter of the cylindrical collars 122 is chosen so that each can telescopically receive a corresponding one of the frustoconical collars 120 in a substantially fluid tight manner. When the unit is subject to a final assembly process such as brazing, a complete seal will be provided.

In some instances, the collars 120,122 may be surrounded by circular rings or sleeves 124 having an axial length equal to the desired spacing between the units 66 for the purpose of providing dimensional stability and avoiding any crushing of the fins 70 during the assembly process by limiting movement of the frustoconical collars 120 into the cylindrical collars 122.

Figure 8:
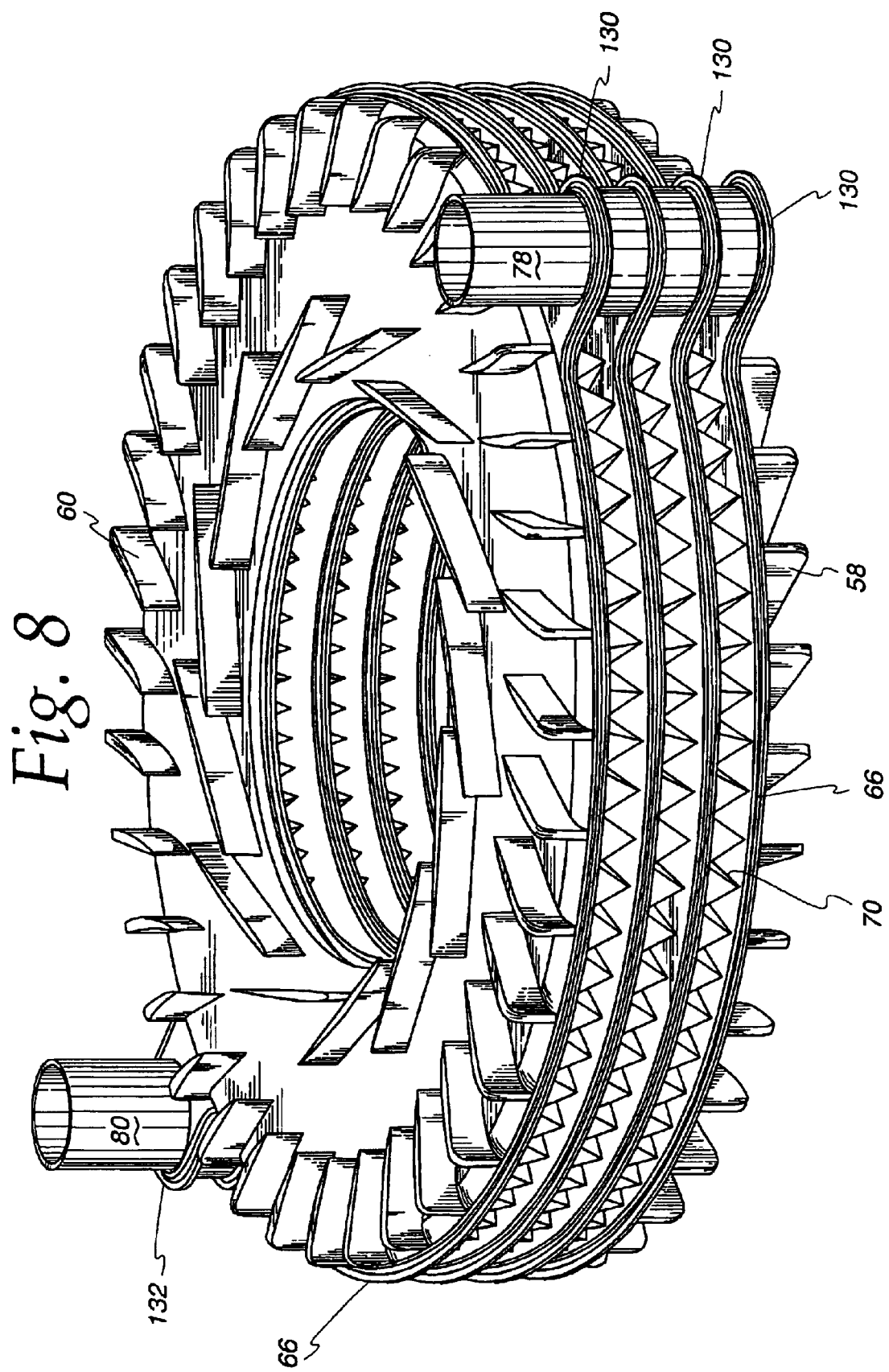
FIG. 8 is a view of another embodiment of the invention wherein a split coolant flow path is obtained.
Figure 9:
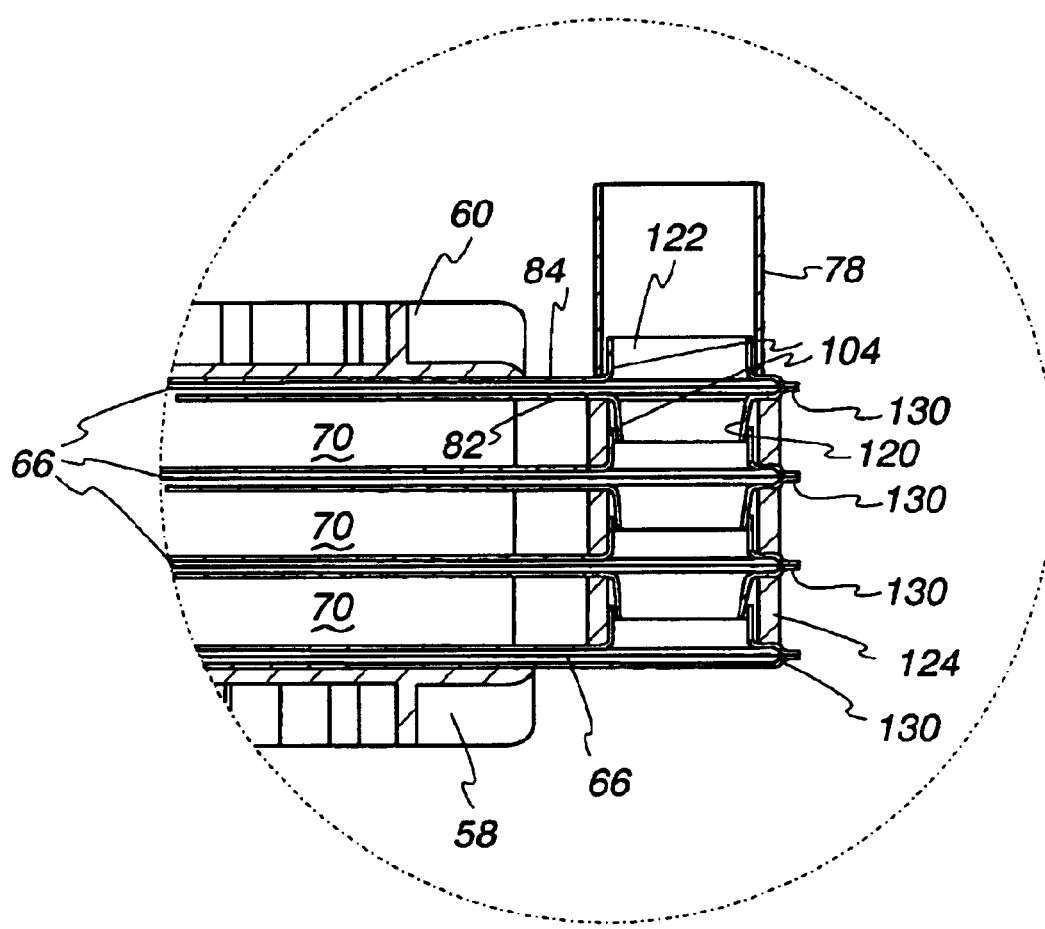
FIG. 9 illustrates a typical inlet or outlet structure for the embodiment of FIG. 8.

FIGS. 8 and 9 shows another embodiment of the heat exchanger that can be employed in the compressor. The embodiment illustrated in FIGS. 8 and 9 is designed to provide one coolant flow pass, one air flow pass from the outer diameter to the inner diameter and to allow the vanes 58 and 60 to be attached to the both of the endmost ones of the units 66 in a thermally bridged manner as mentioned previously. The embodiment shown in FIGS. 8 and 9 is intended to provide split flow between the inlet fixture 78 and outlet fixture 80. That is, flow will travel in two partially circumferential paths, each of 180°, from the inlet to the outlet. To this end, each of the units 66 is provided with two tabs 130,132 which are circumferentially spaced from one another and, in the illustrated embodiment, are diametrically opposite one another. In this embodiment, the tabs 130 are all aligned with one another while the tabs 132 all aligned with one another with the former serving as a means for housing inlet ports to the interior of the units 66 and the tabs 132 serving to house the outlet ports from each of the units 66.

FIG. 9 illustrates the tabs 130 and the inlet fixture 78 but it should be appreciated that the same structure may be used at the outlet tabs 132. Again, the plates 84 are provided with cylindrical collars 122 surrounding the openings 104 while the plates 82 are provided with frustoconical collars 120 surrounding the openings 104. A telescoping relation results. In addition, sleeves 124 may be utilized to assure proper spacing between the individual units 66.

Figure 10:
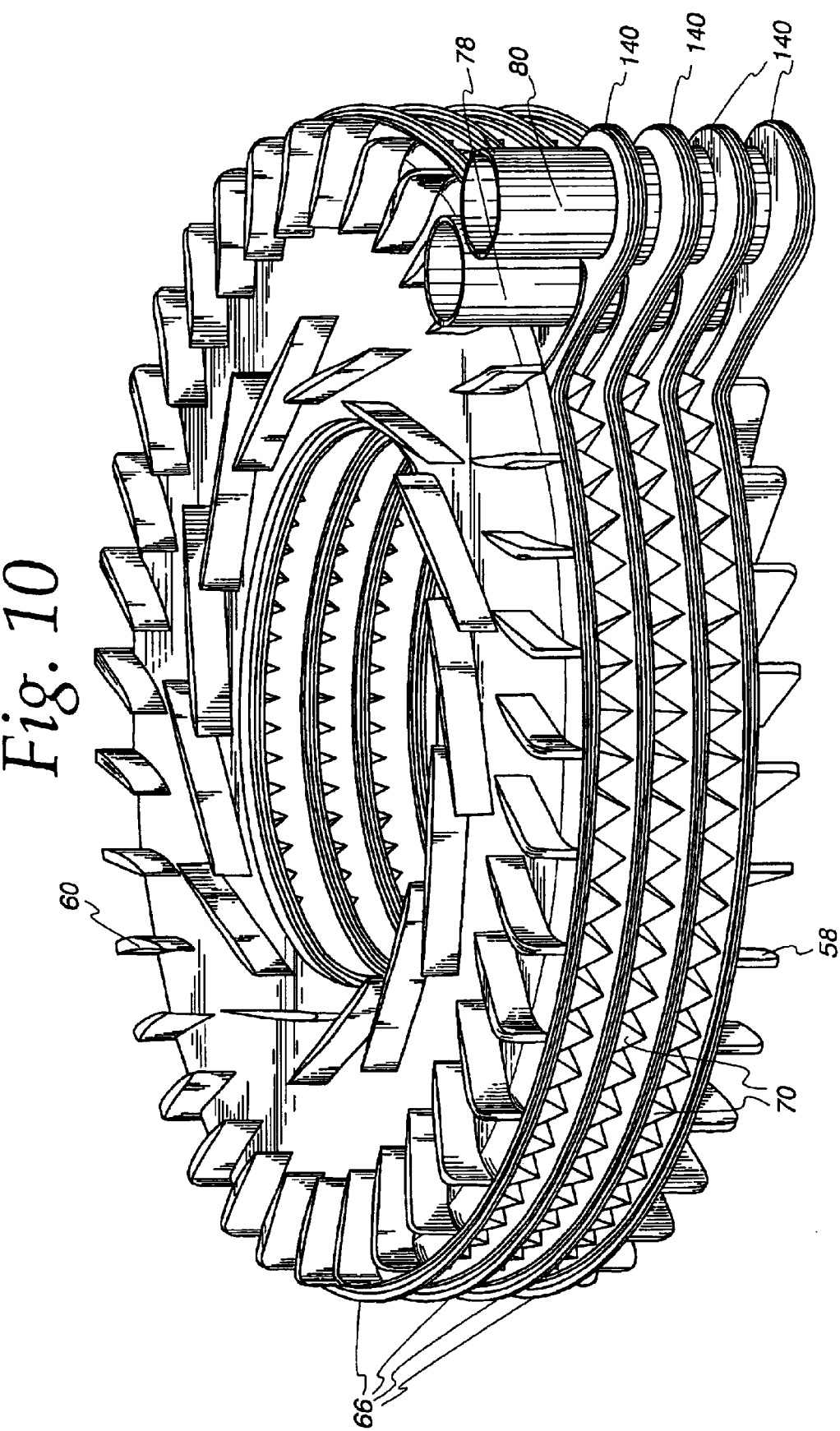
FIG. 10 is a view similar to FIG. 3 but illustrating a modified embodiment wherein provision is made for two pass coolant flow.
Figure 11:
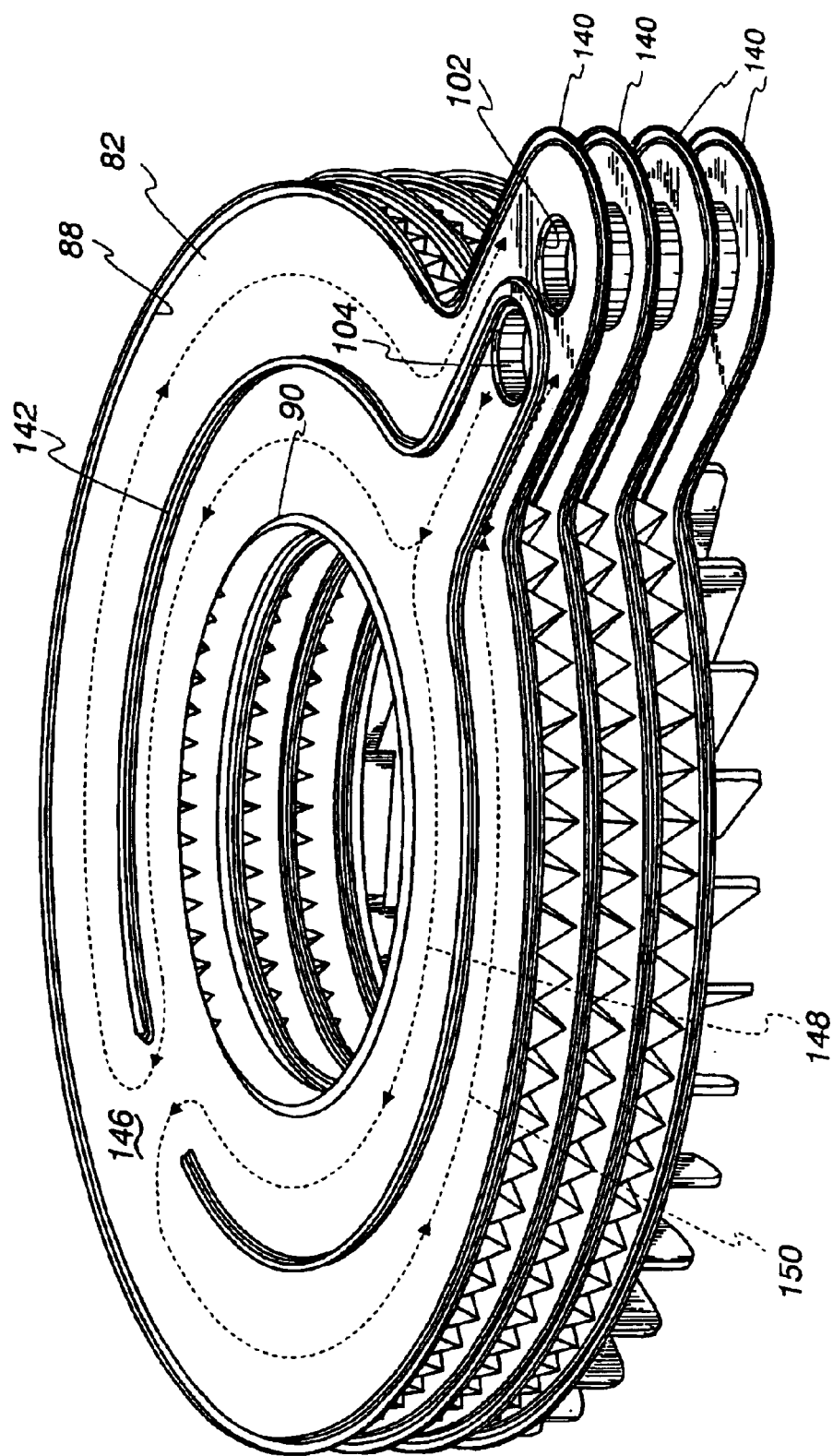
FIG. 11 is a view of the embodiment of FIG. 10 with certain parts removed for clarity.
Figure 12:
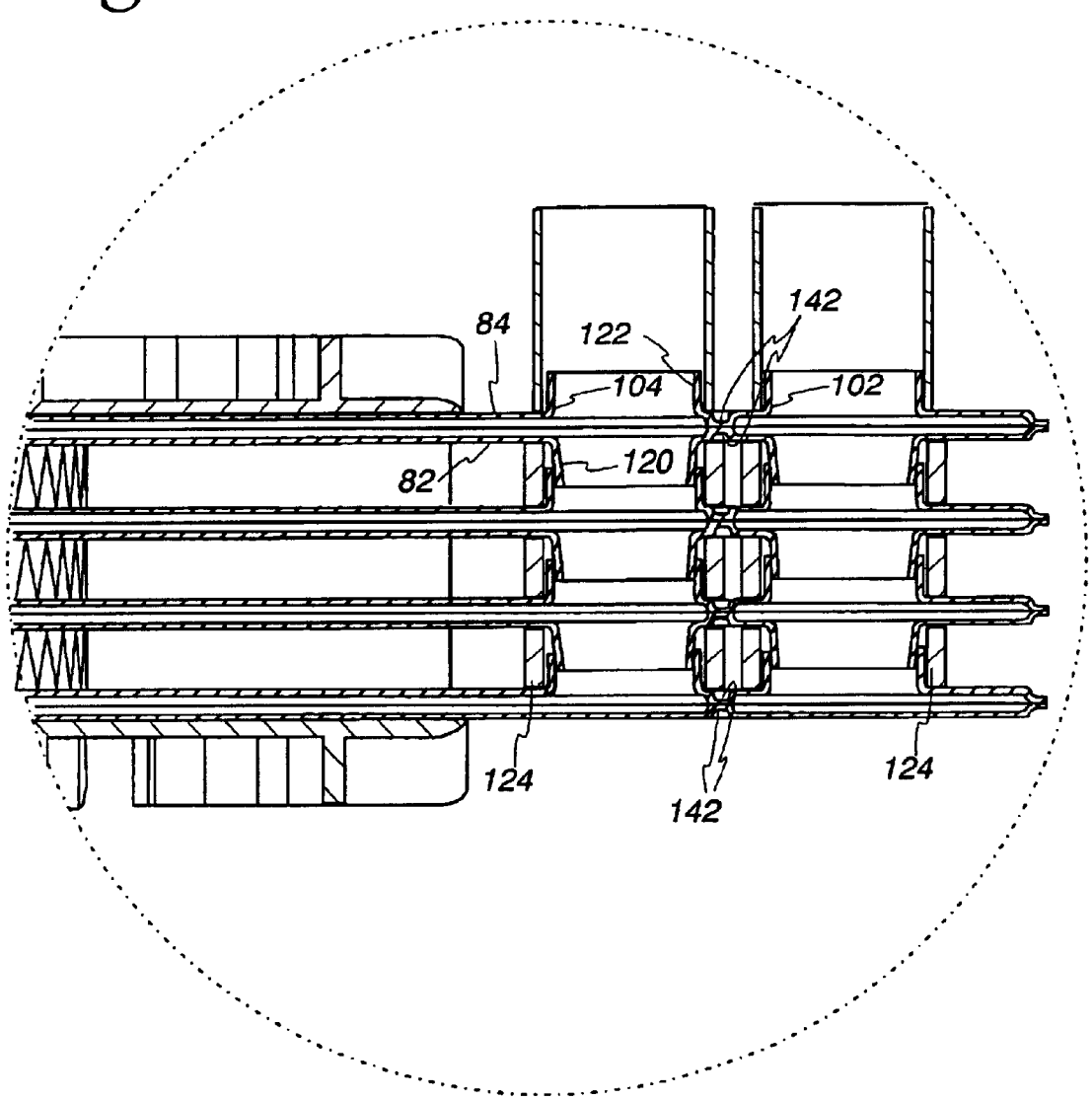
FIG. 12 illustrates an inlet and outlet structure usable with the embodiment of FIGS. 10 and 11.

FIGS. 10, 11 and 12 illustrate an embodiment that provides one pass of air flow from the outside diameter to the inside diameter of the heat exchanger and two passes of coolant flow. In this embodiment, the endmost units 66 in the stack are also capable of both being provided with vanes 58 or 60. Each of the units 66 has but a single, somewhat elongated, radially outwardly directed tab 140 as seen in FIGS. 10 and 11. Each of the tabs also has apertures 102,104 respectively associated with the inlet and the outlet for the coolant flow path but rather than having the inlet and outlet apertures 102,104 being circumferentially spaced as in the embodiments of FIGS. 1–7, the same are radially spaced in the length of the tab 140.

Furthermore, each of the plates 82,84 is provided with a circumferentially extending rib 142 in the pattern illustrated in FIG. 11. The rib 142 is located between the axially directed, radially inner wall 90 of each unit and the radially outer, axially directed wall 88 thereof. As can be seen in FIG. 12, the ribs 142 abut when the units are assembled to thereby form a flow director. In the configuration illustrated, the ribs 142 extend about the radially outer periphery of the inlet apertures 104 to a diametrically opposite location whereat the rib 142 is interrupted as is generally shown at 146.

As a result of this configuration, the incoming coolant flows through a radially inner part of the annular flow path represented by an arrow 148 in split flow to the port 146 where it reverses its direction through a radially outer flow path part indicated by an arrow 150 to return to the outlet apertures 102. In short, the coolant makes two passes in a split flow manner. Cold coolant is first distributed to the inner diameter section of the heat exchanger where the air to be cooled is at a lower temperature due to already having been partially cooled in the flow path 150. This improves the driving temperature differential between the coolant and the charge air to maximize heat exchange efficiency.

As seen in FIG. 12, the apertures 102,104 are again surrounded by cylindrical collars 122 in the plates 84 and frustoconical collars 120 in the plates 82 to achieve the telescoping configuration and resulting seal mentioned previously. And again, spacing sleeves 124 may be disposed about each set of the collars for the inlet and outlet sides of the apparatus.

Figure 13:
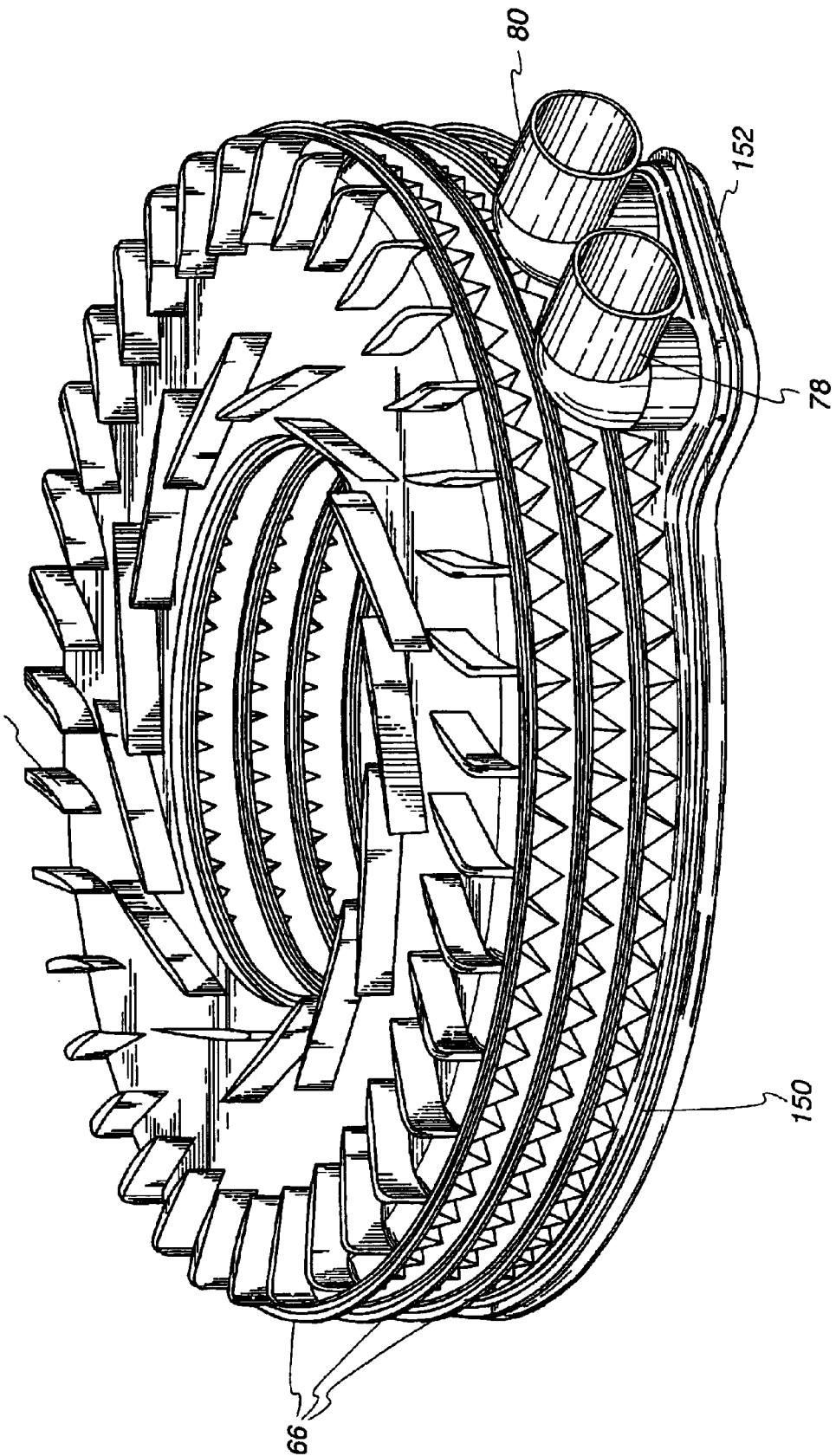
FIG. 13 illustrates still another embodiment of the invention that is generally similar to FIG. 3 but it includes provision for lessening obstruction to air flow through the heat exchanger by the coolant ports.
Figure 14:
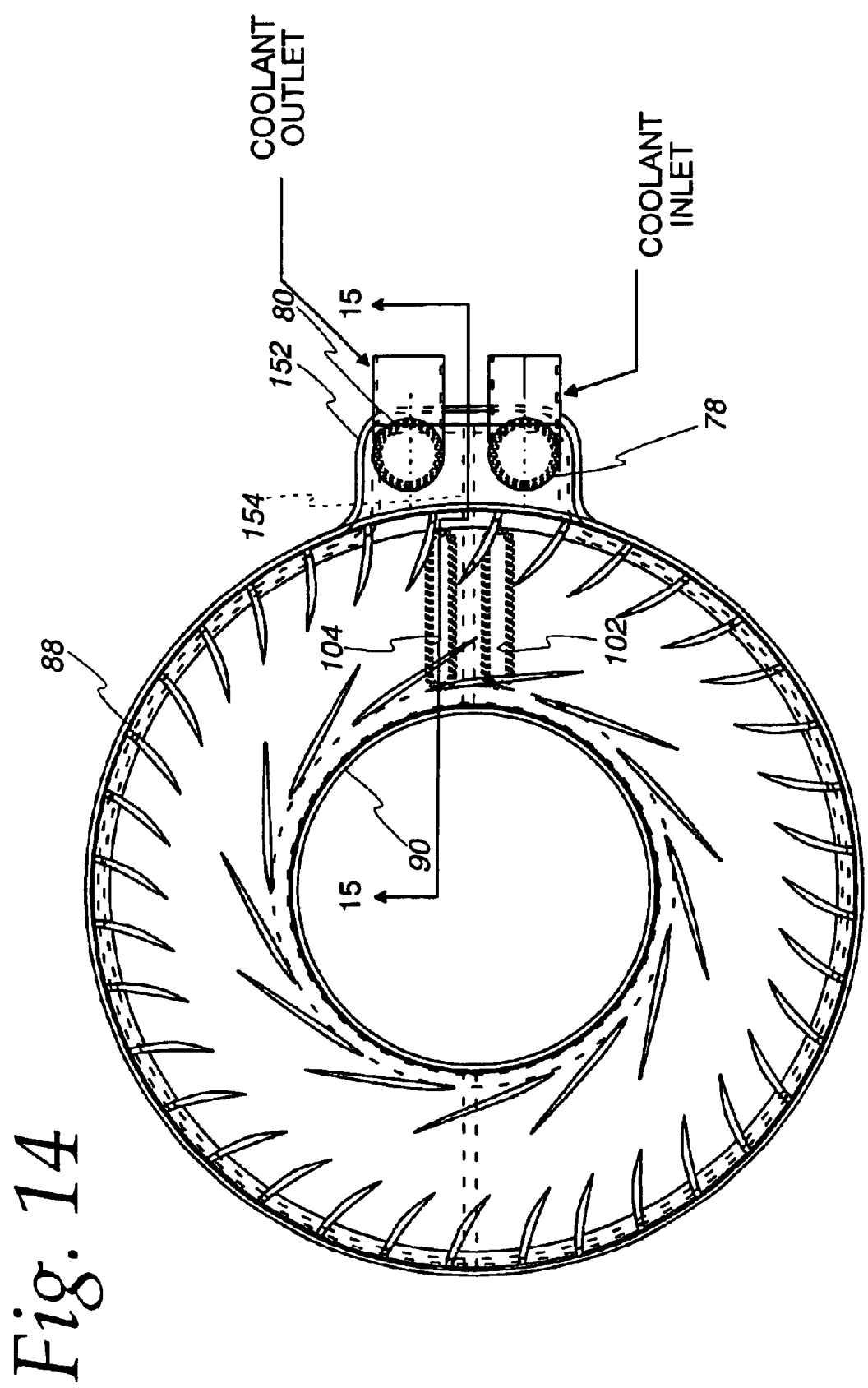
FIG. 14 is a plan view of the embodiment illustrated in FIG. 13.
Figure 15:
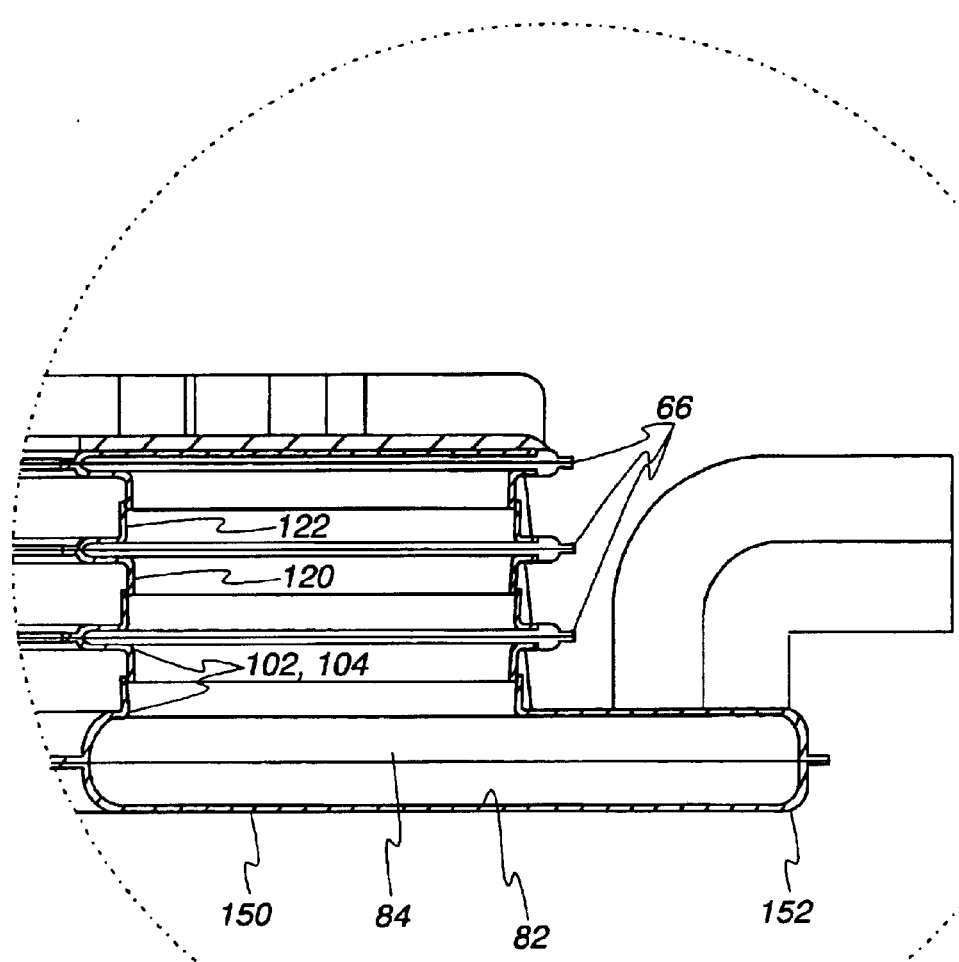
FIG. 15 illustrates a typical inlet or outlet port connection usable with the embodiment of FIGS. 13 and 14.

FIGS. 13–15 illustrate still another embodiment of the invention. In this embodiment, there is one pass from the outer diameter to the inner diameter for air flow and one pass for coolant flow. In addition, the embodiment illustrated in FIG. 13 is capable of having vanes such as the vanes 60 (as well as the vanes 58 which are not shown in these figures) attached to both sides of the heat exchange unit for the purposes mentioned previously.

In this embodiment, one of the endmost ones of the units 66 is given the reference numeral 150 in FIGS. 13 and 15. The unit 150, as can be seen in FIG. 15, has a greater top to bottom dimension than any of the units 66 and thus will have a larger cross-sectional area for its internal flow path.

In this embodiment, only the unit 150 is provided with a radially outwardly directed tab 152 which contains both inlet and outlet fixtures 78,80. The fixtures 78,80 are in fluid communication with the interior of the tab 152.

As seen in FIG. 14, each of the units 66 and 150 are provided with plates 82,84 having radially extending ribs such as the ribs 106 or 142 and which are labeled 154. The ribs extend from the radially outward part of the tab 152 to the radially inner peripheral wall between the inlet and outlet fixtures 78,80.

Also as seen in FIG. 14, each of the units in the stack includes aligned openings 102,104 which are elongated rather than circular in this embodiment. The openings 102, 104 are located at opposite sides of the ribs 154 defining the flow director mentioned previously.

As illustrated in FIG. 15, the openings 102,104 are surrounded by axially directed collars 120,122. The walls of the collars 120 may have a straight interior wall while the collars 122 may have a slightly tapered exterior wall so as to again achieve a sealing, telescoping structure.

The advantage of the embodiment illustrated in FIGS. 13–15 is that the coolant fixtures 78,80 provide for a lesser obstruction of air flow to the radially outer diameter of the heat exchanger. Providing an enlarged cross-sectional area for the unit 152 allows for a less obstructed air flow distribution for this purpose.

Figure 16:
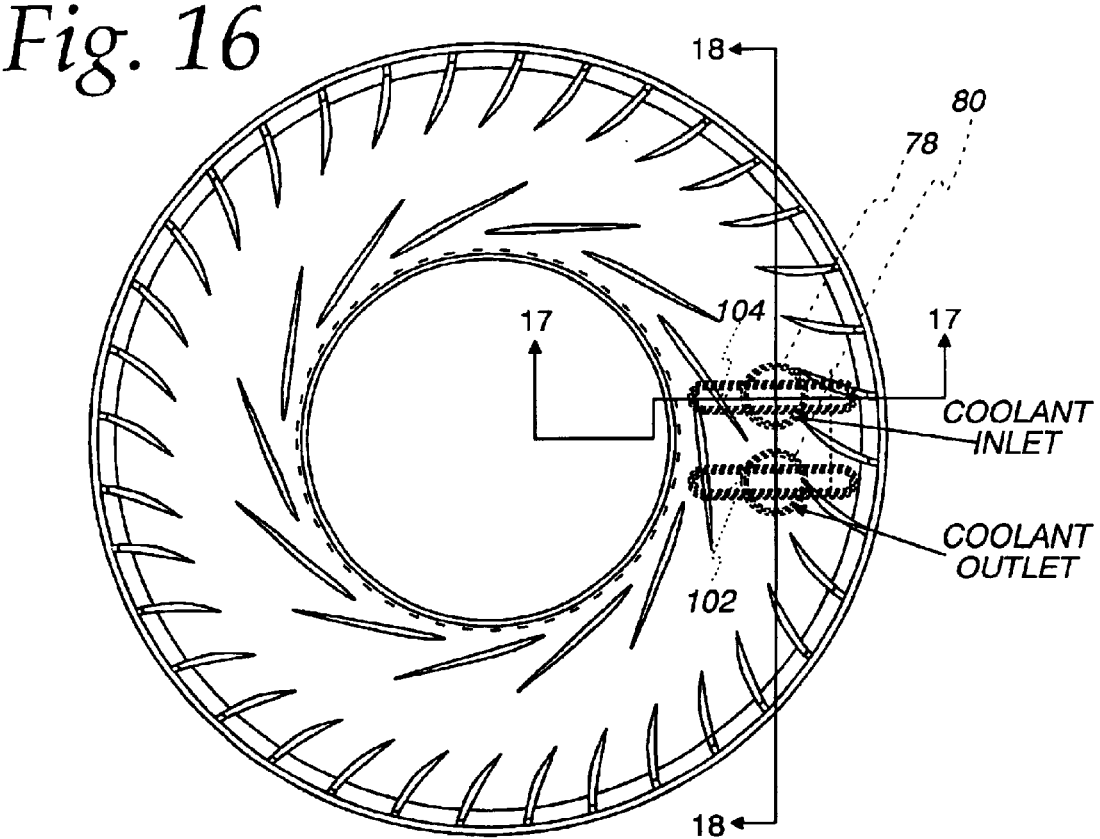
FIG. 16 is a plan view of still another embodiment of the invention which is intended to totally eliminate any obstruction to air flow through the heat exchanger by the coolant inlet and the outlet passages.
Figure 17:
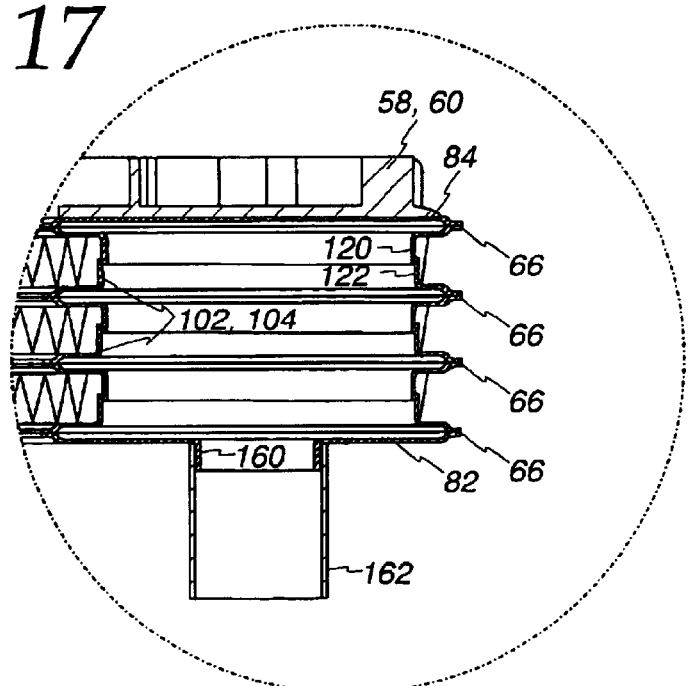
FIG. 17 is an enlarged, fragmentary sectional view taken approximately along the line 17—17 in FIG. 16.
Figure 18:
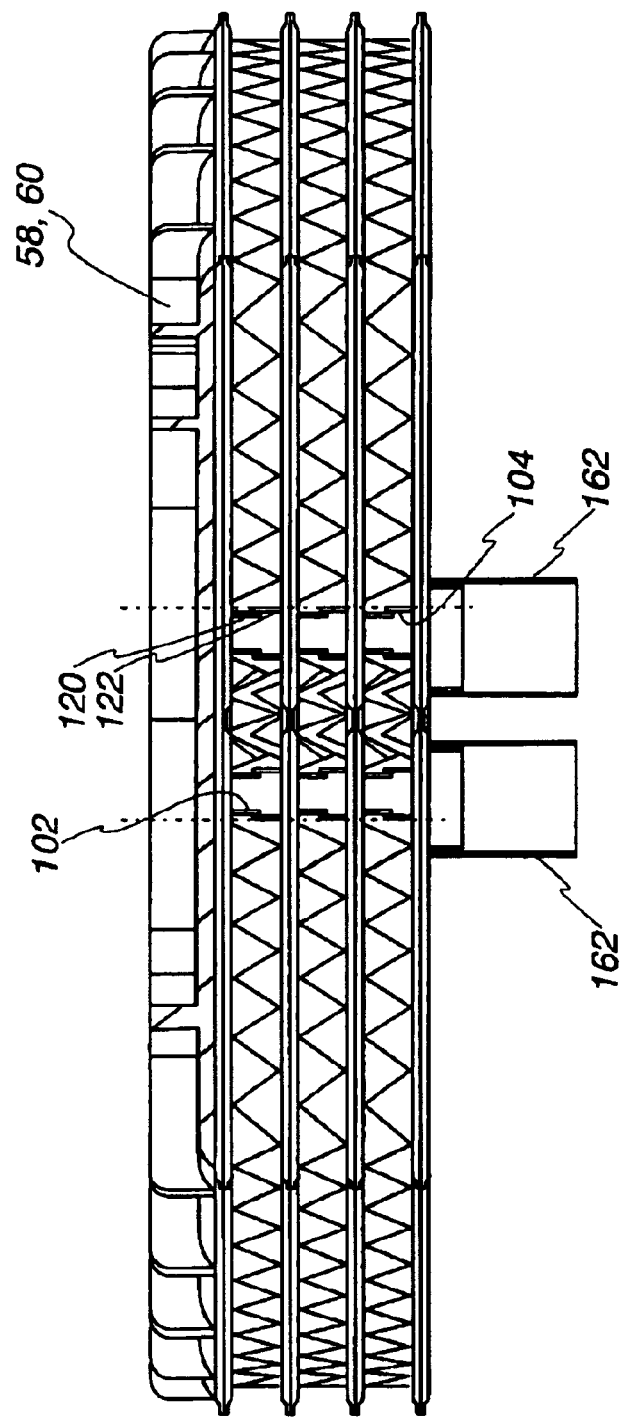
FIG. 18 is an enlarged, fragmentary view of an inlet and outlet structure usable with the embodiment of FIGS. 16 and 17.

FIGS. 16, 17 and 18 illustrate still another embodiment of the invention. In this case, an aperture structure including the apertures 102,104 generally as illustrated in FIG. 14 is provided. However, the tab 152 is omitted in favor of circular ports in the endmost one of the plates 82,84 at the outside of the stack. These circular ports are shown at 160 in FIG. 17 and receive an appropriate inlet or outlet fixture 162 as illustrated. They are aligned with the elongated ports as described in connection with FIG. 14 and again, the apertures 102,104 are surrounded by collars such as the collars 120,122 previously described in connection with the embodiment illustrated in FIG. 15.

Because of the presence of the fixtures 162 on one side of the core as seen in FIG. 17, vanes such as the vanes 58,60, may be placed only on the side of the stack that is opposite the fixtures 162. However, it will be appreciated that the fixtures 162 do not pass by the radially outer part of the stack and thus, totally unobstructed air flow through the core is achieved. The illustrated embodiment provides for one pass of air flow and one pass of coolant flow.

Figure 19:
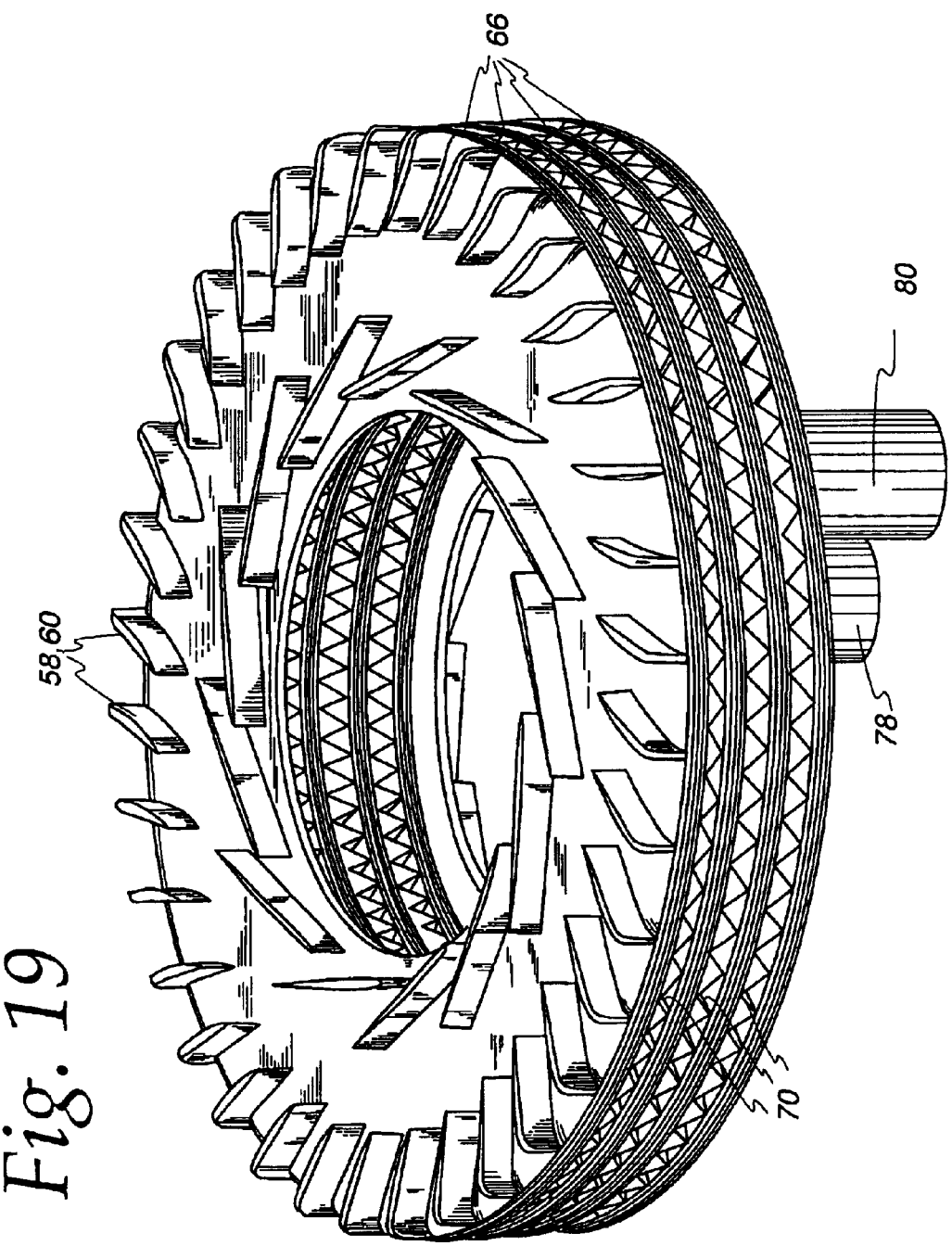
FIG. 19 illustrates still another embodiment of the invention which provides for two passes of coolant flow and total elimination of the obstruction to air flow by coolant inlet and outlet ports.
Figure 20:
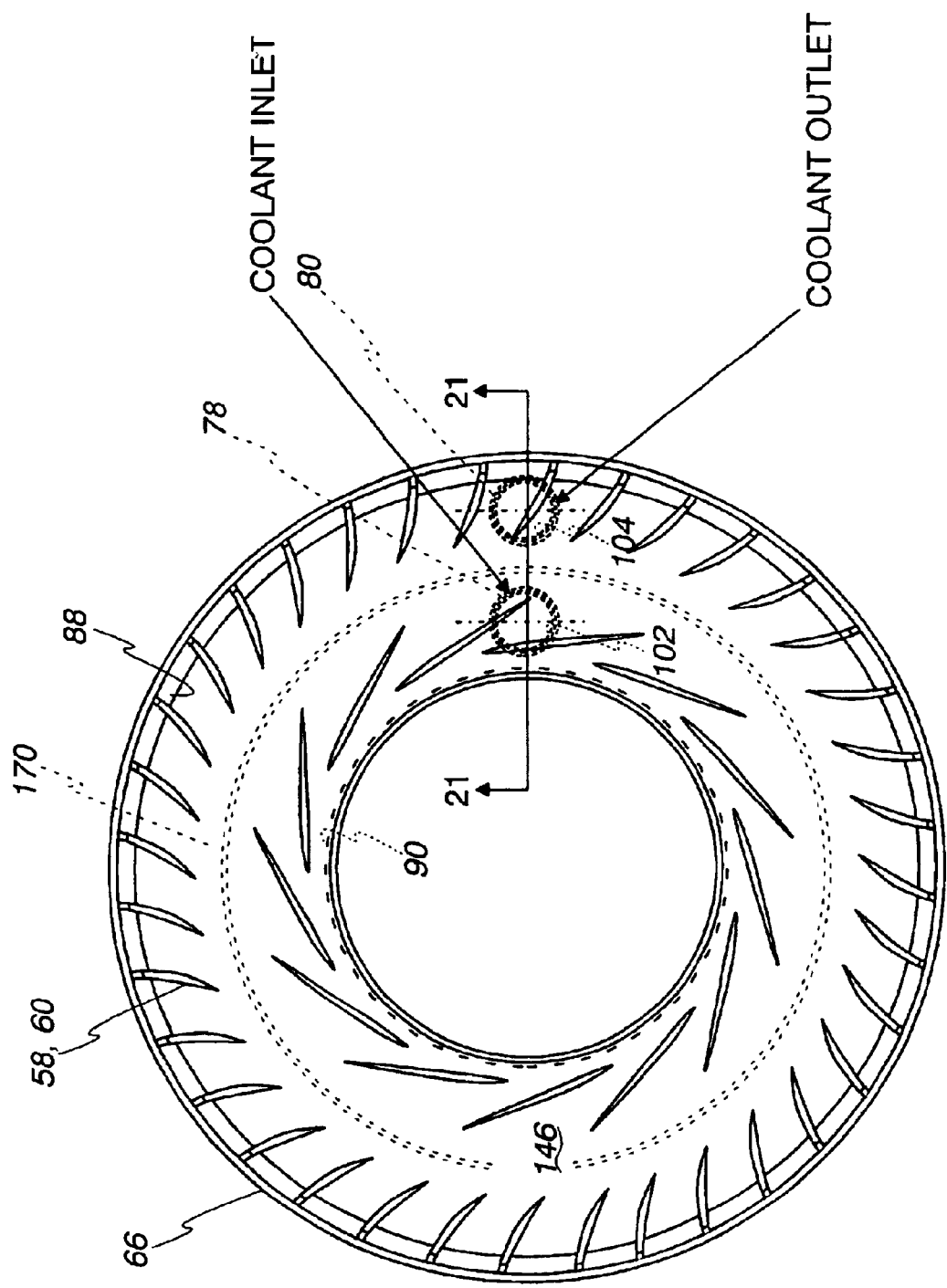
FIG. 20 is a view similar to FIG. 16 but of the embodiment of FIG. 19.
Figure 21:
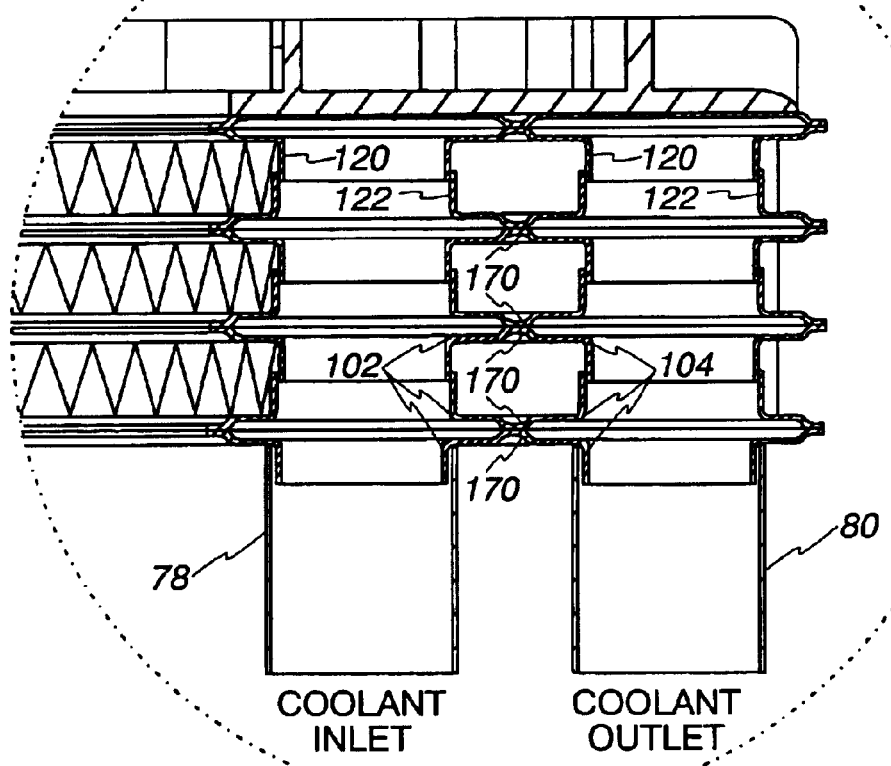
FIG. 21 is a sectional view taken approximately along the line 21—21 in FIG. 20.

FIGS. 19–21 illustrate still another embodiment of the invention. This embodiment combines the primary features of the embodiment of FIGS. 16–18 and the embodiment of FIGS. 10, 11 and 12. In particular, the embodiment of FIGS. 20 and 21 provides for one pass of air flow from the outside diameter to the inside diameter, provides for totally unobstructed air distribution to the outer diameter of the core face, and provides for two pass of coolant flow with the inlet cold coolant first distributed to the inner section of the core and then returned at the outer section of the core. Thermally bridged flow straighteners such as the vanes 58,60 can be mounted on one side of the heat exchanger.

With reference to FIG. 20, each of the units 62 is provided with an internal flow director 170 located between the radially outer wall 88 and the radially inner wall 90 and having an interruption defining a port 146 as mentioned in connection with the embodiment shown in FIGS. 10–12.

In this embodiment, there is a return to circular apertures 102,104 in the plates as best seen in FIG. 20 with the inlets 102 connected to the inlet fixture 78 located radially inwardly of the flow divider 170 and the outlet fixture 80 associated with the apertures 104 located radially outward of the flow divider 170. The apertures 102,104 may be provided with collars 120,122 as shown in FIG. 21 and as described previously.

The embodiment of FIGS. 20 and 21 provides for total lack of obstruction of air flow to the radially outer part of the core as well as improves the temperature differential driving force between the coolant and the gas being cooled by reason of the two pass configuration mentioned previously.

In some instances, thermal coupling of the flow straightening vanes may be by other than metallurgical bonding. For example, if the heat exchanger is made of aluminum and the vanes are of a cast aluminum construction, the use of brazing alloy to effect a metallurgical bond may be prohibitively expensive. As an alternative, a thermally conductive plastic material may be applied as a filler at the interface of the cast flow straightener and the heat exchanger and the former mechanically attached to the latter after brazing, by welding, bolting, riveting or the like. Such materials are known in the electronics industry.

From the foregoing, it will be appreciated that an extremely compact heat exchanger of relatively simple construction is provided. The plates 82,84 of each unit 66 may be made by stamping and assembly effected by known methods of metallurgical bonding as, for example, soldering, brazing or even welding in some instances. Brazing is preferred and to this end, at least one of the surfaces at each interface of two components will be provided with braze alloy. Because the construction is compact, it can be readily incorporated in the discharge end of any radial discharge compressor or the discharge of any stage thereof. As a consequence, ducting for the air from a compressor to a heat exchanger is virtually eliminated entirely.

The locating of diffuser or flow straightening vanes such as the vanes 58,60 on the ends of the stack with the same being thermally coupled to the endmost unit or units 66, or the locating of the fin structures at such locations in lieu of the vanes, enhances heat transfer by providing an additional heat transfer surface in the flow path of the compressed air. In the case of the use of vanes, a dual function is provided in terms of achieving desired flow characteristics within the compressed gas directing space while at the same time providing an additional measure of cooling for the compressed gas as it passes through such space.

What is claimed is:

1. A rotary compressor, comprising:
   a shaft rotatable about an axis;
   at least one compressor wheel mounted on said shaft for rotation therewith and having an inlet end of relatively small diameter and a radial discharge end of relatively large diameter;
   a nominally donut-shaped intercooling heat exchanger centered about said shaft and adjacent said compressor wheel, said heat exchanger having heat exchange fluid flow paths in heat exchange relation with each other including a compressed gas flow path and a coolant flow path, said coolant flow path being bounded in part by a wall of a diameter at least as great as said relatively large diameter;
   a housing for said compressor wheel and said heat exchanger and together with said wall defining a compressed gas directing space extending from said radial discharge end to an entrance to said compressed gas flow path; and
   a plurality of flow straightening vanes thermally coupled to, aid wall and extending across said compressed gas directing space so that heat in said compressed gas may be rejected to said vanes and then to coolant in said coolant flow path.

2. The rotary compressor of claim 1 wherein said wall is generally radially extending and on an end of said heat exchanger closest to said compressor wheel and includes a section of greater diameter than said relatively large diameter, said vanes extending generally radially and being aligned with said section.

3. The rotary compressor of claim 2 wherein said vanes are mounted on said wall at said section.

4. The rotary compressor of claim 2 wherein said vanes are thermally coupled to said section of said wall by metallurgical bonding.

5. The rotary compressor of claim 1 wherein said heat exchanger includes plural pairs of plates, the plates of each pair being centrally apertured and having a generally circular outer axially directed peripheral wall and a generally circular inner axially directed peripheral wall with a generally flat area extending between said peripheral walls and rad ally directed flanges on each peripheral wall axially spaced from the flat area of the corresponding late, the flanges on the plates of each pair being secured and sealed together to define a flattened nominally donut-shaped unit defining annular flow parts of said coolant flow path, said pairs of plates being alternatingly stacked with fin structures extending between radially inner and outer peripheral walls to define radial flow parts of said compressed gas flow paths, there being one of said units on each axial end of said heat exchanger with the flat area of one of the plates of said one unit defining said wall.

6. The rotary compressor of claim 5 wherein each fin structure is a circular serpentine fin having circumferentially alternating crests and valleys with the crests thereof in heat exchange thermal contact with units between which each fin is located.

7. The rotary compressor of claim 6 wherein each of said units includes a radially outwardly directed tab with the tab of each unit being aligned with the tabs of each other unit throughout the stack, the tabs of each unit further extending radially outwardly past the serpentine fins and axially into sealed engagement with each other, two apertures in each tab establishing fluid communication between the units in the stack and flow blocking portion extending across the flat areas of each plate of each unit between the radially inner peripheral walls and the radially outer wall of the tab and at a location between the two apertures of each tab.

8. A rotary compressor, comprising:
a shaft rotatable about an axis;
at least one compressor wheel mounted on said shaft for rotation therewith and having an inlet end of relatively small diameter and a radial discharge end of relatively large diameter;
a nominally donut-shaped intercooling heat exchanger centered about said shaft and adjacent said compressor wheel, said heat exchanger having heat exchange fluid flow paths in heat exchange relation with each other including a compressed gas flow path and a coolant flow path, said coolant flow path being bounded in part by a wall of a diameter at least as great as said relatively large diameter, said heat exchanger including plural pairs of plates, the plates of each pair being centrally apertured and having a generally circular outer axially directed peripheral wall and a generally circular inner axially directed peripheral wall with a generally flat area extending between said peripheral walls, and radially directed flanges on each peripheral wall axially spaced from the flat area of the corresponding plate, the flanges on the plates of each pair being secured and sealed together to define a flattened, nominally donut-shaped unit defining annular flow parts of said coolant flow path, said pairs of plates being alternatingly stacked with fin structures extending between said radially inner and outer peripheral walls defining radial flow parts of said compressed gas flow path, there being one of said units on each axial end of said hear exchanger with the flat area of one of the plates of said unit defining said wall, each said fin structure being a circular serpentine fin having circumferentially alternating crests and valleys with the crests thereof in heat exchange thermal contact with units between which each fin is located, each of said units further including inlet and outlet ports with the inlet and outlet ports of each unit being aligned with and sealed to the inlet and outlet ports of each adjacent unit in the stack;
inlet and outlet fixtures mounted and sealed to the inlet and outlet of one of said units; and
a housing for said compressor wheel and said heat exchanger and together with said wall defining a compressed air directing space extending from said radial discharge end to an entrance to said compressed air path.

9. The rotary compressor of claim 8 including an additional one of said compressor wheels in axially spaced relation on said shaft to said at least one compressor wheel and there are two of said walls and axially spaced from each other, one adjacent said discharge end of said at least one compressor wheel and one adjacent the discharge end of said additional compressor wheel.

10. The rotary compressor of claim 9 further including first and second sets of flow straightening vanes, one set being mounted on one of said walls in thermally coupled relation therewith and another set being mounted on the other of said walls in thermally coupled relation therewith.

11. The rotary compressor of claim 9 wherein there are serpentine fins on each of said two walls, one adjacent the discharge end of each of said compressor wheels.

12. The rotary compressor of claim 8 wherein each of said units includes a radially outwardly directed tab with the tab of each unit being aligned with the tabs of the other units throughout said stack, the tab of each further extending radially outwardly past the serpentine fins, said inlet and outlet ports including aligned apertures in said tabs.

13. The rotary compressor of claim 12 wherein said ports further include axially directed collars surrounding said aligned apertures and engaging and sealed to collars of the adjacent tabs and establishing fluid communication between the apertures, and thus the units, in the stack, and flow blocking partition extending across flat areas of each plate of each unit between the radially inner and outer peripheral walls thereof at a location between said inlet ports and said outlet ports.

14. The rotary compressor of claim 12 where each said tab extends axially into sealed engagement with adjacent tabs about said apertures.

15. The rotary compressor of claim 14 wherein each said tab extends axially into said sealed engagement by means of axially directed collars surrounding said aligned apertures.

16. The rotary compressor of claim 15 wherein adjacent sealed collars telescope into one another.

17. The rotary compressor of claim 12 wherein each said unit includes two of said tabs, said two tabs being circumferentially spaced about said circular outer axially directed peripheral wall, and said inlet parts are in one of the tabs of each said unit and said outlet ports are in the other of the tabs of each said unit.

18. The rotary compressor of claim 8 further including at least one circumferential flow director within each said unit at a location radially inward of said outer axially directed peripheral wall and radially outward of said inner axially directed peripheral wall, said outlet ports being in fluid communication with a first space between one of said peripheral walls and said flow director and said inlet ports being in fluid communication with a second space between the other of said peripheral walls and said flow director.

19. The rotary compressor of claim 18 further including a port in each of said flow directors at a location remote from said inlet and outlet ports establishing fluid communication between said first and second spaces.

20. A rotary compressor, comprising:

a shaft rotatable about an axis;

at least one compressor wheel mounted on said shaft for rotation therewith and having an inlet end of relatively small diameter and a radial discharge end of relatively large diameter;

a nominally donut-shaped intercooling heat exchanger centered about said shaft and adjacent said compressor wheel, said heat exchanger having heat exchange fluid flow paths in heat exchange relation with each other including a compressed gas flow path and a coolant flow path, said coolant flow path being bounded in part by a wall of a diameter at least as great as said relatively large diameter, said heat exchanger including plural pairs of plates, the plates of each pair being centrally apertured and having a generally circular outer axially directed peripheral wall and a generally circular inner axially directed peripheral wall with a generally flat area extending between said peripheral walls, and radially directed flanges on each peripheral wall axially spaced from the flat area of the corresponding plate, the flanges on the plates of each pair being secured and sealed together to define a flattened, nominally donut-shaped unit defining annular flow parts of said coolant flow path, said pairs of plates being alternatingly stacked with fin structures extending between said radially inner and outer peripheral walls defining radial flow parts of said compressed gas flow path, there being one of said units on each axial end of said heat exchanger with the flat area of one of the plates of said unit defining said wall, each said fin structure being a circular serpentine fin having circumferentially alternating crests and valleys with the crests thereof in heat exchange thermal contact with units between which each fin is located, each of said units including aligned inlet and outlet ports for the annular flow parts of said coolant flow path, said inlet and outlet ports including aligned apertures in said plates.

21. The rotary compressor of claim 20 wherein said apertures are surrounded by axially directed collars, aligned ones of said collars being sealed to one another.

22. The rotary compressor of claim 21 wherein said collars are integral with their respective plates and telescope into one another.

23. The rotary compressor of claim 22 further including flow directors in each of said units separating said inlet and outlet ports to cause flow through said annular flow parts.

24. The rotary compressor of claim 23 wherein said flow directors are circumferentially directed.

25. The rotary compressor of claim 23 wherein said flow directors are radially directed.

26. The rotary compressor of claim 20 wherein one of said units additionally includes a radially directed tab and inlet and outlet fixture mounted to said tab and being respectively in fluid communication with the inlet and outlet ports in said one unit.

27. The rotary compressor of claim 26 wherein said one unit has an annular flow part of greater cross-sectional area than the annular flow part of the other of said units.

* * * * *

UNITED STATES PATENT AND TRADEMARK OFFICE
CERTIFICATE OF CORRECTION

| | |
|---|---|
| PATENT NO. | : 6,948,909 B2 |
| APPLICATION NO. | : 10/663312 |
| DATED | : September 27, 2005 |
| INVENTOR(S) | : Steven P. Meshenky et al. |

It is certified that error appears in the above-identified patent and that said Letters Patent is hereby corrected as shown below:

Column 10, line 58, delete "aid" and substitute therefor --said--.

Column 11, line 12, delete "rad ally" and substitute therefor --radially--.

Column 11, line 13, delete "late" and substitute therefor --plate--.

Column 11, line 67, delete "hear" and substitute therefor --heat--.

Signed and Sealed this

Twenty-seventh Day of March, 2007

JON W. DUDAS
*Director of the United States Patent and Trademark Office*